US009019357B2

(12) United States Patent
Fu

(10) Patent No.: US 9,019,357 B2
(45) Date of Patent: Apr. 28, 2015

(54) METHOD FOR ADJUSTING DISPLAY OF STEREOSCOPIC IMAGES OF STEREOSCOPIC IMAGE DISPLAY MODULE AND RELATED STEREOSCOPIC IMAGE DISPLAY MODULE

(75) Inventor: Chuan-Cheng Fu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 717 days.

(21) Appl. No.: 13/345,751

(22) Filed: Jan. 9, 2012

(65) Prior Publication Data
US 2013/0050191 A1 Feb. 28, 2013

(30) Foreign Application Priority Data
Aug. 22, 2011 (TW) .............................. 100130006 A

(51) Int. Cl.
G02B 27/22 (2006.01)
H04N 13/04 (2006.01)

(52) U.S. Cl.
CPC ........ *G02B 27/2214* (2013.01); *H04N 13/0409* (2013.01); *H04N 13/0497* (2013.01); *G02B 27/225* (2013.01)

(58) Field of Classification Search
CPC ............. G02B 27/2214; G02B 27/225; H04N 13/0497; H04N 13/0409
USPC ...................................................... 348/51–59
See application file for complete search history.

(56) References Cited

U.S. PATENT DOCUMENTS

| | | | |
|---|---|---|---|
| 7,245,430 B2* | 7/2007 | Kobayashi et al. ............ | 359/464 |
| 8,373,617 B2* | 2/2013 | Kim et al. ......................... | 345/6 |
| 8,692,971 B2* | 4/2014 | Chiu .............................. | 349/200 |
| 2004/0263968 A1* | 12/2004 | Kobayashi et al. ........... | 359/462 |
| 2007/0008617 A1* | 1/2007 | Shestak et al. ................ | 359/455 |
| 2009/0033812 A1* | 2/2009 | Ijzerman et al. ................ | 349/15 |
| 2010/0097449 A1* | 4/2010 | Jeong et al. ..................... | 348/59 |
| 2010/0118118 A1* | 5/2010 | Krah ................................ | 348/40 |
| 2010/0194705 A1* | 8/2010 | Kim et al. ..................... | 345/173 |
| 2010/0195190 A1* | 8/2010 | Ishioka et al. ................ | 359/316 |
| 2010/0195203 A1* | 8/2010 | Zuidema et al. .............. | 359/463 |
| 2012/0008203 A1* | 1/2012 | Ijzerman et al. .............. | 359/465 |

(Continued)

FOREIGN PATENT DOCUMENTS

CN 1784022 A 6/2006
JP 2010256815 A 11/2010

OTHER PUBLICATIONS

Office action mailed on May 30, 2014 for the China application No. 201110266297.2, p. 3 line 6-31, p. 4 line 1-6, line 8-10, line 12-13, line 15-19, line 21-23 and line 25-30, p. 5 line 1-27 and line 29-30 and p. 6 line 1-3, line 5-8 and 10-11.

*Primary Examiner* — Gelek W Topgyal
(74) *Attorney, Agent, or Firm* — Winston Hsu; Scott Margo

(57) ABSTRACT

A method for adjusting display of stereoscopic images of a stereoscopic image display module is disclosed. The stereoscopic image display module includes a sensing unit, a display unit, and an active barrier board. The active barrier board is disposed at a side of the display unit. A plurality of slits and a plurality of barriers are formed on the active barrier board and arranged alternately. The method includes displaying a stereoscopic image by the display unit, detecting a tilt angle of the stereoscopic image display module by the sensing unit, and adjusting relationship of the plurality of slits and the plurality of barriers by the stereoscopic image display module according to the tilt angle.

12 Claims, 5 Drawing Sheets

(56) References Cited

U.S. PATENT DOCUMENTS

| | | | |
|---|---|---|---|
| 2012/0092586 A1* | 4/2012 | He et al. | 349/61 |
| 2013/0160942 A1* | 6/2013 | Zuidema | 156/277 |
| 2013/0242235 A1* | 9/2013 | Wei et al. | 349/96 |
| 2014/0079383 A1* | 3/2014 | Lo | 396/322 |

\* cited by examiner

METHOD FOR ADJUSTING DISPLAY OF STEREOSCOPIC IMAGES OF STEREOSCOPIC IMAGE DISPLAY MODULE AND RELATED STEREOSCOPIC IMAGE DISPLAY MODULE

BACKGROUND OF THE DISCLOSURE

1. Field of the Disclosure

The present disclosure relates to a method for adjusting display of stereoscopic images and a related stereoscopic image display module, and more specifically, to a method for adjusting display of stereoscopic images of a stereoscopic image display module according to different tilt angles of the stereoscopic image display module and a related stereoscopic image display module.

2. Description of the Prior Art

In general, stereoscopic images are transmitted as left eye images and right eye images viewed by a user's left and right eyes, respectively. The left eye images and the right eye images received by the two eyes are matched as a stereoscopic image that has focal range and gradation according to a discrepancy between visual angles of the two eyes.

However, when a user utilizes a stereoscopic image display device to view stereoscopic images by a parallax barrier method, the user may view ghost images or opposite images from the original viewing angle if the stereoscopic image display device is deflected by a tilt angle. The said viewing problem may provide the user with a poor stereoscopic visual feeling.

SUMMARY OF THE DISCLOSURE

The present disclosure provides a method for adjusting display of stereoscopic images of a stereoscopic image display module. The stereoscopic image display module includes a sensing unit, a display unit, and an active barrier board. The active barrier board is disposed at a side of the display unit. A plurality of slits and a plurality of barriers are formed on the active barrier board and arranged alternately. The method includes displaying a stereoscopic image by the display unit, detecting a tilt angle of the stereoscopic image display module by the sensing unit, and adjusting relationship of the plurality of slits and the plurality of barriers by the stereoscopic image display module according to the tilt angle.

The present disclosure further provides a stereoscopic image display module with a function of adjusting display of stereoscopic images. The stereoscopic image display module includes a stereoscopic image display device, a sensing unit, and a processing unit. The stereoscopic image display device includes a display unit and an active barrier board. The display unit is used for displaying a stereoscopic image. The active barrier board is disposed at a side of the display unit and has a plurality of slits and a plurality of barriers formed thereon and arranged alternately. The sensing unit is disposed on the stereoscopic image display device for detecting a tilt angle of the stereoscopic image display device. The processing unit is electrically coupled to the stereoscopic image display device and the sensing unit for adjusting relationship of the plurality of slits and the plurality of barriers according to the tilt angle.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
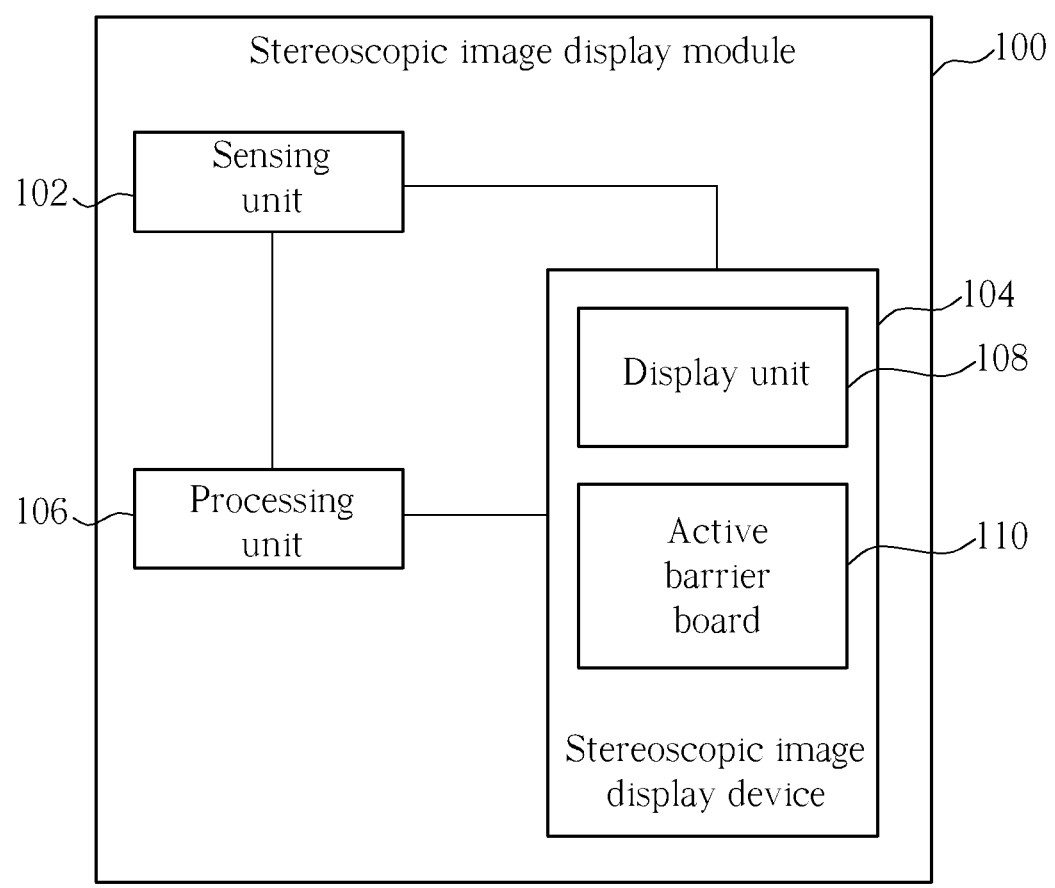
FIG. 1 is a functional block diagram of a stereoscopic image display module according to an embodiment of the present disclosure.

Please refer to FIG. 1, which is a functional block diagram of a stereoscopic image display module 100 according to an embodiment of the present disclosure. As shown in FIG. 1, the stereoscopic image display module 100 includes a sensing unit 102, a stereoscopic image display device 104 and a processing unit 106. The sensing unit 102 is disposed on the stereoscopic image display device 104. The sensing unit 102 is used for detecting a tilt angle of the stereoscopic image display device 104. In this embodiment, the sensing unit 102 is a gravity sensor for sensing an acceleration variation of the stereoscopic image display device 104 to detect the tilt angle of the stereoscopic image display device 104.

Figure 2:
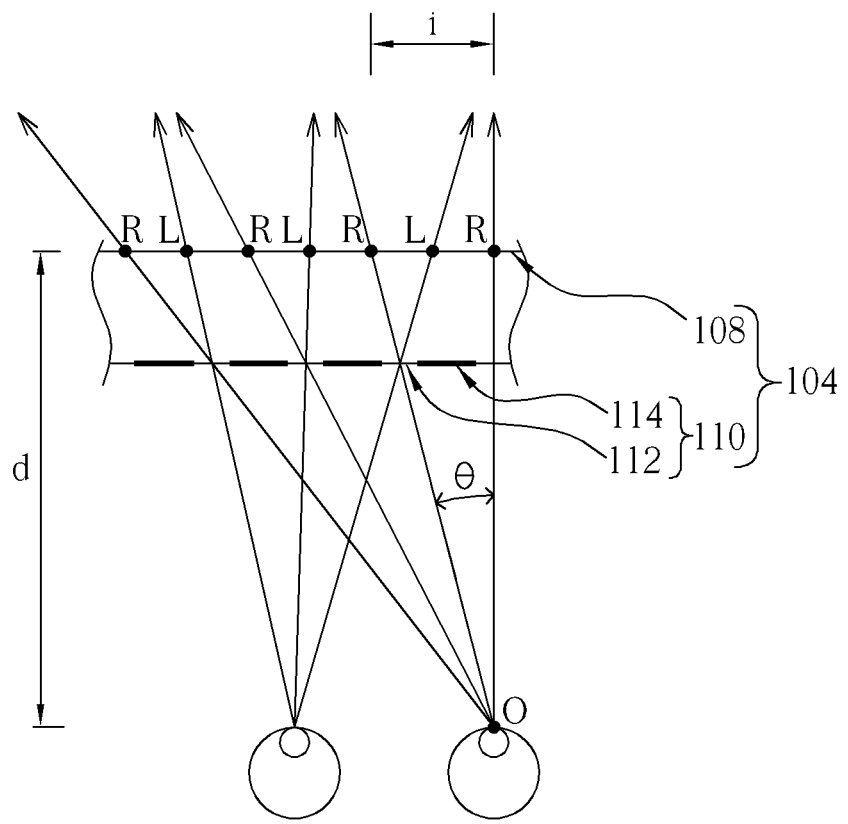
FIG. 2 is a partial diagram of a stereoscopic image display device in FIG. 1 displaying stereoscopic images.

Please refer to FIG. 1 and FIG. 2. FIG. 2 is a partial diagram of the stereoscopic image display device 104 in FIG. 1 displaying stereoscopic images. The stereoscopic image display device 104 includes a display unit 108 and an active barrier board 110. The display unit 108, for example, is a liquid crystal display device for displaying stereoscopic images, but is not limited thereto. As shown in FIG. 2, the stereoscopic images displayed by the display unit 108 are composed of a plurality of first images R and a plurality of second images L, which are arranged alternately. The first images R can be right eye images for a user's right eye, and the second images L can be left eye images for the user's left eye. The active barrier board 110 is disposed at a side of the display unit 108 and has a plurality of slits 112 and a plurality of barriers 114 formed thereon and arranged alternately. The processing unit 106 is electrically coupled to the stereoscopic image display device 104 and the sensing unit 102. The processing unit 106 can be hardware, software, or firmware for adjusting relationship of the plurality of slits 112 and the plurality of barriers 114 according to the tilt angle of the stereoscopic image display device 104 detected by the sensing unit 102. To be more specific, the processing unit 106 is used for calculating a corresponding viewing deflection angle according to the tilt angle of the stereoscopic image display device 104 detected by the sensing unit 102 and then adjusting the relationship of the plurality of slits 112 and the plurality of barriers 114 according to the calculated viewing deflection angle.

Figure 3:
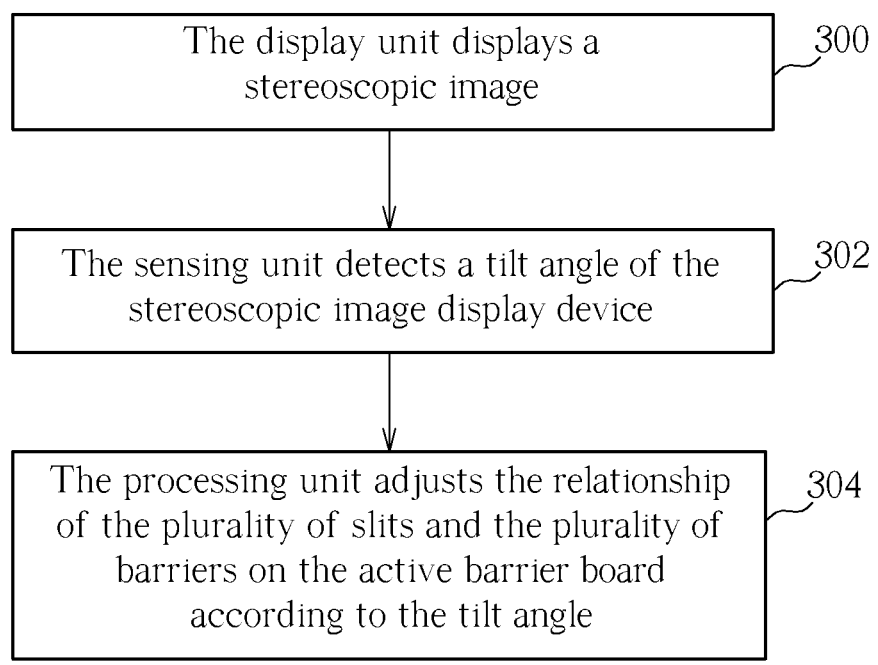
FIG. 3 is a flowchart of a method for adjusting display of stereoscopic images of the stereoscopic image display device by utilizing the stereoscopic image display module in FIG. 1 according to an embodiment of the present disclosure.

Please refer to FIG. 3, which is a flowchart of a method for adjusting display of stereoscopic images of the stereoscopic image display device 104 by utilizing the stereoscopic image display module 100 in FIG. 1 according to an embodiment of the present disclosure. The method includes the following steps.

Step 300: The display unit 108 displays a stereoscopic image;

Step 302: The sensing unit 102 detects a tilt angle of the stereoscopic image display device 104;

Step 304: The processing unit 106 adjusts the relationship of the plurality of slits 112 and the plurality of barriers 114 on the active barrier board 110 according to the tilt angle.

More detailed description for the said steps from the viewing angle of the user's right eye (indicated by O in FIG. 2) and adjustment for the relationship of one set of the slit 112 and the barrier 114 on the active barrier board 110 is provided as follows for simplicity. As for the related description for the said steps from the viewing angle of the user's left eye and adjustment for the relationship of other sets of the slits 112 and the barriers 114 on the active barrier board 110, it can be reasoned by analogy and therefore omitted herein.

Figure 4:
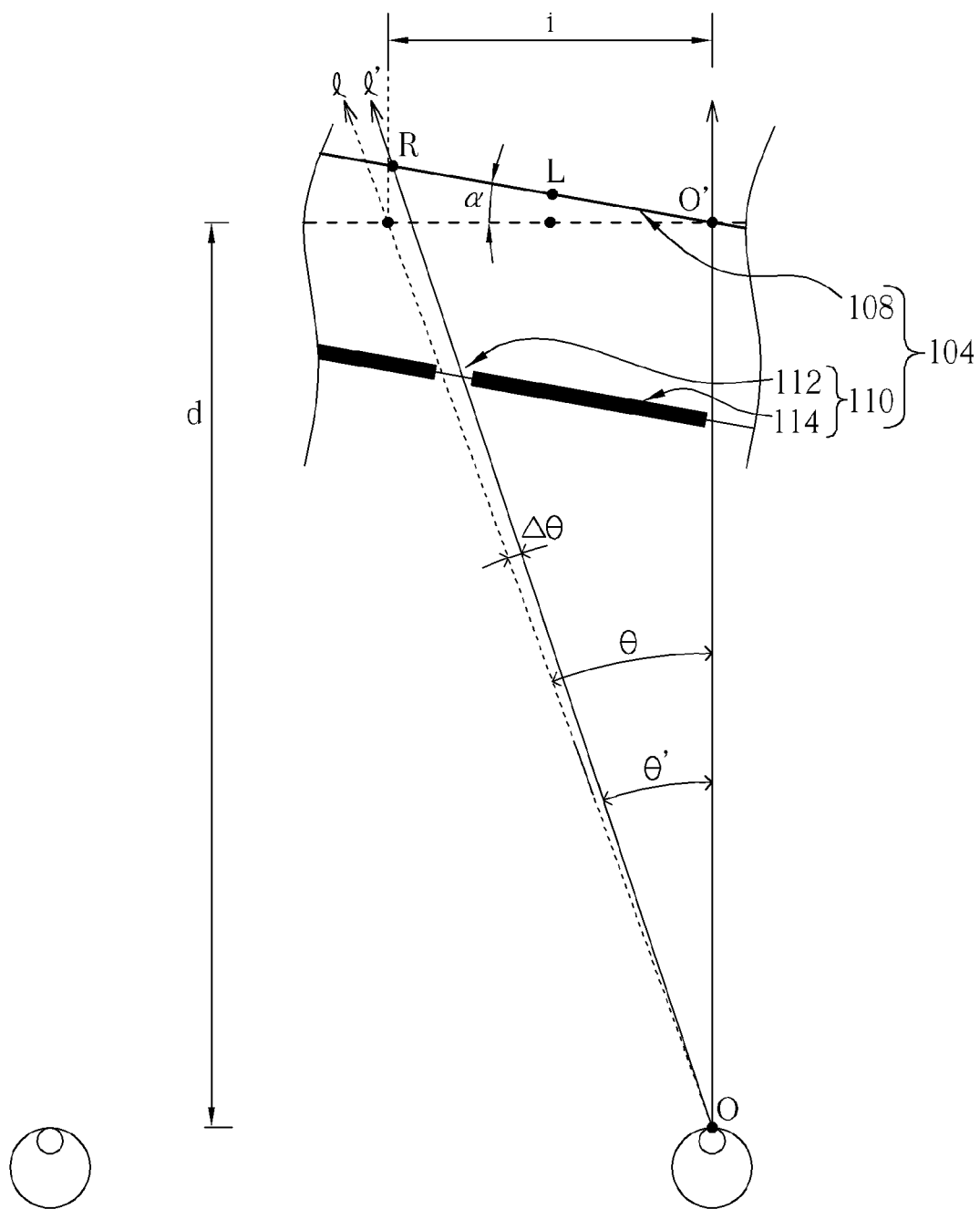
FIG. 4 is a partial diagram of the stereoscopic image display device in FIG. 2 being deflected by a tilt angle.
Figure 5:
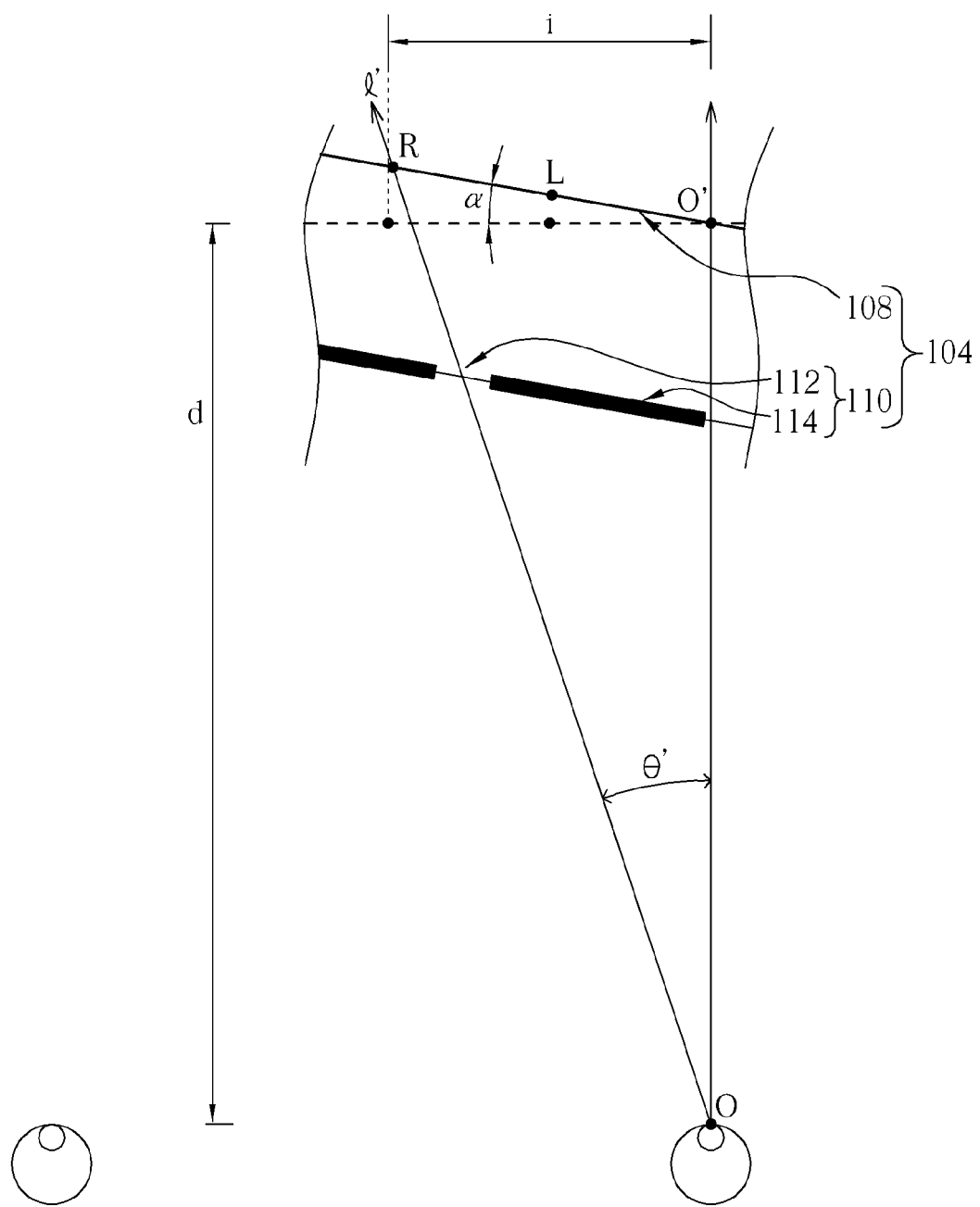
FIG. 5 is a partial diagram of the stereoscopic image display device in FIG. 4 after adjusting relationship of a plurality of slits and a plurality of barriers.

Please refer to FIGS. 1-5. FIG. 4 is a partial diagram of the stereoscopic image display device 104 in FIG. 2 being deflected by a tilt angle $\alpha$. FIG. 5 is a partial diagram of the stereoscopic image display device 104 in FIG. 4 after adjusting the relationship of the plurality of slits 112 and the plurality of barriers 114. The display unit 108 displays the stereoscopic image (Step 300). If the stereoscopic image display module 100 is in an environment that makes the stereoscopic image display device 104 deflected easily (e.g. the stereoscopic image display module 100 is utilized on a running train), the user may view incorrect images since the plurality of slits 112 and the plurality of barriers 114 on the active barrier board 110 will be deflected simultaneously with deflection of the stereoscopic image display device 104. For example, when the stereoscopic image display device 104 is deflected by the tilt angle $\alpha$ from a position as shown in FIG. 2 to a position as shown in FIG. 4, the user's right eye (i.e. the viewing position O) can not view the first image R, which has been offset, along a line 1 from the original viewing angle $\theta$ (as shown in FIG. 4) if the relationship of the plurality of slits 112 and the plurality of barriers 114 is not adjusted. At this time, for making the user capable of viewing correct images, the sensing unit 102 detects the acceleration variation of the stereoscopic image display device 104 for determining that the stereoscopic image display device 104 is deflected by the tilt angle $\alpha$ (Step 302), and transmits the said detected result to the processing unit 106. In such a manner, the processing unit 106 can adjust the relationship of the plurality of slits 112 and the plurality of barriers 114 on the active barrier board 110 according to the tilt angle $\alpha$.

To be more specific, when the sensing unit 102 detects that the stereoscopic image display device 104 is deflected by the tilt angle $\alpha$, the sensing unit 102 transmits this detected result to the processing unit 106 for calculating a viewing deflection angle $\Delta\theta$ corresponding to the stereoscopic image. In the following, calculation for the viewing deflection angle $\Delta\theta$ is described in detail. As shown in FIG. 4, a distance between the viewing position O of the user's right eye and the display unit 108 which has not been deflected yet is set as d, a distance between two adjacent first images R is set as I, and a position O' of the first image R opposite to the user's right eye is set as the origin (i.e. (0, 0)). Based on the said setting, the coordinate of the first image R as shown in FIG. 4 is (i, 0), and the coordinate of the first image R after the stereoscopic image display device 104 has been deflected by the tilt angle $\alpha$ is (i cos $\alpha$, i sin $\alpha$). Thus, in this embodiment, the processing unit 106 can calculate the viewing deflection angle $\Delta\theta$ according to the following equation:

$$\Delta\theta = \tan^{-1}(\theta) - \tan^{-1}(\theta') = \tan^{-}(i/d) - \tan^{-1}[(i\cos\alpha)/(d + i\sin\alpha)]$$

After the processing unit 106 calculates the viewing deflection angle $\Delta\theta$, the relationship of the plurality of slits 112 and the plurality of barriers 114 can be adjusted according to the viewing deflection angle $\Delta\theta$. For example, the processing unit 106 can adjust a width ratio of the plurality of slits 112 and the plurality of barriers 114. In this embodiment, the processing unit 106 can reduce the width of the plurality of barriers 114 to increase the width of the plurality of slits 112, so as to change the width ratio of the plurality of slits 112 and the plurality of barriers 114 from the width ratio as shown in FIG. 4 to the width ratio as shown in FIG. 5. As for relationship of the viewing deflection angle $\Delta\theta$ and the width ratio of the plurality of slits 112 and the plurality of barriers 114, it can be derived by a conventional math geometry calculation (e.g. by trigonometric equations) and therefore omitted herein.

In such a manner, via adjustment for the width ratio of the plurality of slits 112 and the plurality of barriers 114 on the active barrier board 110, the viewing angle of the user's right eye relative to the plurality of slits 112 and the plurality of barriers 114 can automatically be changed from the viewing angle as shown in FIG. 4 to the viewing angle as shown in FIG. 5. Accordingly, the user can view the correct images along the line 1' from the viewing angle $\theta'$ without manually adjusting the tilt angle of the stereoscopic image display module 100 or changing his viewing angle relative to the stereoscopic image display module 100 by himself. To be noted, the said adjustment for the relationship of the plurality of slits 112 and the plurality of barriers 114 on the active barrier board 110 can be not limited to the adjustment for the width ratio of the plurality of slits 112 and the plurality of barriers 114 mentioned in the aforesaid embodiment. That is to say, the present disclosure can utilize other design having the same viewing-angle adjusting effect. For example, the processing unit 106 can adjust the viewing angle of the user relative to the plurality of slits 112 and the plurality of barriers 114 by offsetting a position of each slit 112 relative to a corresponding barrier 114.

Furthermore, a method for adjusting the relationship of the plurality of slits 112 and the plurality of barriers 114 on the active barrier board 110 is commonly seen in the prior art, such as U.S. patent publication No. 20060126177. In U.S. patent publication No. 20060126177, a control unit is used for controlling liquid crystal units on an active barrier board to be selectively transparent to form transparent slits or opaque to form opaque barriers according to image signals, so as to achieve the purpose that the relationship (e.g. the arrangement or the width ratio) of the transparent slits and the opaque barriers can be adjusted by the control unit. For example, if the stereoscopic image display module 100 adopts the control design disclosed in U.S. patent publication No. 20060126177, the active barrier board 110 can be designed to include a plurality of liquid crystal units (not shown in figures). In such a manner, the processing unit 106 can control transparency of the plurality of liquid crystal units to form the slits 112 and the barriers 114 arranged alternately and then adjust the relationship of the slits 112 and the barriers 114 according to the viewing deflection angle. To sum up, all designs for utilizing a sensing unit to detect a tilt angle of a stereoscopic image display device and then adjusting relationship of slits and barriers on an active barrier board according to the tilt angle may fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for adjusting display of stereoscopic images of a stereoscopic image display module, the stereoscopic image display module comprising a sensing unit, a display unit, and an active barrier board, the active barrier board being disposed at a side of the display unit, a plurality of slits and a plurality of barriers being formed on the active barrier board and arranged alternately, the method comprising:

displaying a stereoscopic image by the display unit, the stereoscopic image comprising a plurality of first images and a plurality of second images arranged alternately;

detecting a tilt angle of the stereoscopic image display module by the sensing unit;

calculating a viewing deflection angle corresponding to the stereoscopic image by the stereoscopic image display module according to a distance between two adjacent first images, a distance between the display unit and a viewing position, and the tilt angle; and adjusting relationship of the plurality of slits and the plurality of barriers by the stereoscopic image display module according to the viewing deflection angle.

2. The method of claim 1, wherein calculating the viewing deflection angle according to the distance between the two adjacent first images, the distance between the display unit and the viewing position, and the tilt angle comprises:

calculating the viewing deflection angle by the stereoscopic image display module according to the following equation:

$$\text{the viewing deflection angle} = \tan^{-1}(\text{the distance between the two adjacent first images/the distance between the display unit and the viewing position}) - \tan^{-1}\{[\text{the distance between the two adjacent first images}*\cos(\text{the tilt angle})]/[\text{the distance between the display unit and the viewing position} + \text{the distance between the two adjacent first images}*\sin(\text{the tilt angle})]\}.$$

3. The method of claim 1, wherein adjusting the relationship of the plurality of slits and the plurality of barriers by the stereoscopic image display module according to the viewing deflection angle comprises:

adjusting a width ratio of the plurality of slits and the plurality of barriers by the stereoscopic image display module according to the viewing deflection angle.

4. The method of claim 3, wherein the active barrier board comprises a plurality of liquid crystal units, and adjusting the width ratio of the plurality of slits and the plurality of barriers by the stereoscopic image display module according to the viewing deflection angle comprises:

forming the plurality of slits and the plurality of barriers on the active barrier board and then adjusting the width ratio of the plurality of slits and the plurality of barriers by controlling transparency of the plurality of liquid crystal units.

5. The method of claim 1, wherein the active barrier board comprises a plurality of liquid crystal units, and adjusting the relationship of the plurality of slits and the plurality of barriers by the stereoscopic image display module according to the viewing deflection angle comprises:

forming the plurality of slits and the plurality of barriers on the active barrier board and then adjusting the relationship of the plurality of slits and the plurality of barriers by controlling transparency of the plurality of liquid crystal units.

6. The method of claim 1, wherein detecting the tilt angle of the stereoscopic image display module by the sensing unit comprises:

detecting the tilt angle of the stereoscopic image display module by sensing an acceleration variation of the stereoscopic image display module.

7. A stereoscopic image display module with a function of adjusting display of stereoscopic images, the stereoscopic image display module comprising:

a stereoscopic image display device comprising:

a display unit for displaying a stereoscopic image, the stereoscopic image comprises a plurality of first images and a plurality of second images arranged alternately; and an active barrier board disposed at a side of the display unit and having a plurality of slits and a plurality of barriers formed thereon and arranged alternately;

a sensing unit disposed on the stereoscopic image display device for detecting a tilt angle of the stereoscopic image display device; and a processing unit electrically coupled to the stereoscopic image display device and the sensing unit for calculating a viewing deflection angle corresponding to the stereoscopic image by the stereoscopic image display module according to a distance between two adjacent first images, a distance between the display unit and a viewing position, and the tilt angle and further for adjusting relationship of the plurality of slits and the plurality of barriers according to the viewing deflection angle.

8. The stereoscopic image display module of claim 7, wherein the processing unit is used for calculating the viewing deflection angle according to the following equation:

$$\text{the viewing deflection angle} = \tan^{-1}(\text{the distance between the two adjacent first images/the distance between the display unit and the viewing position}) - \tan^{-1}\{[\text{the distance between the two adjacent first images}*\cos(\text{the tilt angle})]/[\text{the distance between the display unit and the viewing position} + \text{the distance between the two adjacent first images}*\sin(\text{the tilt angle})]\}.$$

9. The stereoscopic image display module of claim 7, wherein the active barrier board comprises a plurality of liquid crystal units, and the processing unit is used for forming the plurality of slits and the plurality of barriers on the active barrier board and then adjusting a width ratio of the plurality of slits and the plurality of barriers by controlling transparency of the plurality of liquid crystal units.

10. The stereoscopic image display module of claim 7, wherein the active barrier board comprises a plurality of liquid crystal units, and the processing unit is used for forming the plurality of slits and the plurality of barriers on the active barrier board and then adjusting the relationship of the plurality of slits and the plurality of barriers by controlling transparency of the plurality of liquid crystal units.

11. The stereoscopic image display module of claim 7, wherein the sensing unit comprises a gravity sensor for sensing an acceleration variation of the stereoscopic image display device to detect the tilt angle of the stereoscopic image display device.

12. The stereoscopic image display module of claim 7, wherein the display unit is a liquid crystal display device.

* * * * *